Patented May 6, 1941

2,240,480

UNITED STATES PATENT OFFICE 2,240,480

MOLDING COMPOSITION AND PROCESS OF MANUFACTURE

Edward R. Dillehay, Glen Ellyn, Ill., assignor to The Richardson Company, Lockland, Ohio, a corporation of Ohio No Drawing. Application January 12, 1937, Serial No. 120,321

3 Claims. (Cl. 106—22)

My invention relates to the making of molding compositions in which the binder is a synthetic or condensation resin. Compositions of the general class have been suggested for a wide variety of uses, and to such uses my novel composition may be applied, although for purposes of an exemplary disclosure I shall describe it in connection with the manufacture of heavy duty compositions, particularly such compositions as are designed for use as bearings, especially of the heavy-duty type.

Bearing material has long been made of laminated resinous stock, e. g. canvas or duck saturated in the incompletely polymerized resin, laid together in laminations, and cured under heat and pressure. After the curing of a block of this material, the required bearing shape is machined out. It is recognized that laminated bearings or the like, and the processes of making them are subject to a number of defects, such for example as the unequal strengths of the material in different directions, the possibility of delamination, especially where graphite as a lubricant is mixed with the resin, the wastage involved in machining out odd-shaped pieces from substantially rectangular blocks, and the like. A primary object of my invention is to provide a molding composition and molded article made therefrom which will have the good qualities of former compositions without their defects. Another primary object of the invention is the provision of a novel method of manufacture of such materials. These and other objects of my invention, which will be set forth hereinafter or will be apparent to one skilled in the art upon reading these specifications, I accomplish by that series of process steps and in that composition and article made therefrom, of which I shall now describe the aforesaid exemplary embodiment.

In the practice of my invention, I make a composition of which the binder is a suitable synthetic or condensation resin. I am not limited to any particular type of resin; but for the purpose of an exemplary disclosure I shall refer to the resins of the phenol-formaldehyde type. The fibrous material employed is in the form of cords, filaments, strands or loose fibrous stuff, rather than in the form of a felted or woven web. Graphite or other lubricant may or may not be used as desired. Also other fillers may be employed without departing from the spirit of my invention.

In the manufacture of compositions from a resinous binder and a loose fibrous filler (which per se, of course, is not new) a number of serious problems arise, which have not so far as I know, hitherto been satisfactorily solved. There is first the problem of the proper impregnation of the fibrous strands, cords or the like. Next there is the problem of the proper distribution of the resin in the composition in the mass of fibres and on the fibrous stuff itself. This is related to the matter of the distribution of the fibrous material in the completed composition after molding and curing. There is the problem of the production of a molding composition which can be evenly and completely cured, and in which there will not be an uneven clotting of the fibrous materials or islands of clear resin. There is frequently the problem of the distribution of several different substances in the fibrous material.

For heavy duty materials, the fibrous materials used should be tough and strong. Preferably, for this service, I employ cotton cords, or at least a percentage of cord material along with unspun fibrous stock. The fibrous material, or at least a large percentage of it will preferably also be long. The requirements here are not exact; in general what is desired is a material as long as possible, but not too long to give a mixable mass. In the materials currently used by me, there is a large percentage of cord material ranging up to about one inch in length. As a cheap and convenient, but entirely satisfactory material, I have been employing chopped tire cord, which is a cord material used in the manufacture of automobile tires.

The amount of resin must be controlled with relation to the fibres so as to give in the completed composition before molding a condition which may be described as a body of fibrous material containing a distributed resin. A condition is not desired in which there is a body of resin, which is continuous, and within which the fibrous strands or the like are floating. The resin should be evenly distributed as the fibrous body and as to the individual fibrous strands or the like. The relationship of the fibrous body and the resin should be such that the body before molding contains and holds the resin and there is no tendency toward dissociation.

The amount of resin which can be used with a given quantity of fibrous stuff will depend somewhat on the porosity of the fibrous material, and will also depend somewhat on the presence or absence of filler materials. When filler materials are present these tend to take up some of the resin, and more resin may consequently be used. A general rule is not to use more than say 65 to 70% resin based on the total weight of the composition. An excellent material for heavy duty bearings may be made, for example, to the following formula:

| | Per cent |
|---|---|
| Resin | 55 |
| Chopped tire cord | 38 |
| Graphite | 7 |

These quantities are exemplary, of course, and not limiting. Where graphite is employed, I prefer to use the exceedingly finely divided graphite described in the copending application of Louis T. Frederick entitled Bearings and bearing material, filed May 22, 1935, Ser. No. 22,802. An advantage of the use of graphite in my type of composition is that because of the structure and arrangement of the fibrous reinforcement, there is no tendency toward delamination. As a consequence, the quantity of graphite which may be employed is not subject to the same limitations. In cases where this is desirable, the quantity of graphite may be increased to 15% and higher.

The conditions which I have indicated as necessary may be met, I have found, with suitable percentages of ingredients, if (a) the resin is associated with the fibres while, at some stage of the association, the resin is effectively in a liquid condition, (b) and if, during the association, and subsequent to the intimate saturating of saturable components of the fibrous mass, the resin is brought into a non-flowing condition during a continuation of the mixing, whereby the preassociation of the resin and the fibres, and the relative distribution of the fibres and the resin is made permanent. It goes without saying that the resin is in an incompletely polymerized stage during the association steps.

I have found that several modes of operation can satisfy these requirements, with varying degrees of advantage. The resin, during the initial stages of the mixing, is desired to be in a thinly liquid condition both so as rapidly to saturate into the fibrous mass as such, and also so as to penetrate into the strands and cords and to saturate and coat as nearly as possible each individual fibre. The latter of these functions is the more important one. It is entirely practicable to secure a good relative distribution of a mass of fibres and a mass of resin if the resin is not in a thinly liquid, but is in a viscous and thick or plastic condition. Indeed a heavy condition of the resin may assist in that type of distribution, and I utilize this effect in the later stages of the process. But a complete coating and penetration of the individual fibres, in so far as possible, is essential, especially where materials not subject to dimensional changes or swelling from external moisture is required, and this can only be obtained, so far as my investigations have gone, by treating the fibres with the resin at some stage of the process in as thinly liquid a condition as possible.

Most incompletely polymerized resins can be rendered quite liquid by the application of heat, and in most instances the heat can be controlled so as to allow an adequate mixing time without setting the resin up to an undesirably complete condition. Where using heat to liquefy the resin, however, it is advisable to keep the mixing stage as short as possible, so that I prefer to use that type of mixing machine in which the cycle is shortened by the use of very intense mechanical action, frequently accompanied by pressure. The well known Banbury mixer, or other known types of pressure mixers will be found suitable here.

This type of mixing is, however, delicate and somewhat more difficult. I prefer, therefore to render the resin liquid by other means. Thus, the usual type of varnish may be used, which is an incompletely polymerized resin cut back with a suitable solvent, such as alcohol. When using such a varnish, I may employ a machine of the dough-mixed type, such as the well known Werner-Pfleiderer mixer. With the resin in a thinly liquid condition, the initial saturation proceeds rapidly. Therefore, it is possible to pass without delay to the next stage of the mixing. Thus I may start with my mixer hot, say at a temperature of 320° F., maintained by steam under pressure in the mixer jacket.

In either type of mixing operation after the first or initial saturation step, I allow the resin to assume a thickened, pasty or plastic condition, and continue the mixing. In the first mixing procedure referred to, where the resin is melted by heat, the change occurs through polymerization, through a lowering of the temperature, or through both. In the mixing procedure involving a solvent varnish, the change in resin condition occurs primarily through evaporation of the solvent, though ultimately partly through polymerization. In either event the mixing continues with a thickened condition of the binder, which assists in the relative distribution of the binder and the fibrous material and gives ultimately a homogeneous distribution of the binder on the fibrous material, which is stable in the sense that the resin has become so heavy that dissociation from the fibres cannot occur. Preferably the mixing is continued until the resin has set up to the proper condition for molding.

I prefer to employ the process which I have described, wherein the material is made by mixing the fibre with a resin varnish, for example, an incompletely polymerized resin in alcohol solution and containing say 50 to 60% of resin solids, in a Werner-Pfleiderer or similar mixer. This process has a large number of advantages. The solvent helps rapidly to distribute the resin throughout the bulky mass of fibre initially, facilitates the coating and penetration of individual strands, fibres and the like, and greatly retards the setting up of the resin so that the fibre can readily be impregnated and coated before the resin advances to the insoluble and infusible stage. The mixing is carried out as indicated in a hot, steam-heated mixer so that the solvent is evaporating during the mixing process. The presence of the solvent keeps the temperature of the mass below the setting point of the resin; and the fibres are saturated and coated while most of the solvent is still present. The mixing is continued for a short time after the alcohol has been driven off, both to complete the distribution, as indicated, and to advance the resin to just the proper stage for good molding, as may be recognized by the skilled worker in the art. The resin should be set up to a point where it still has sufficient flow to distribute itself in the mold, but is neither so liquid nor so fusible that it will squeeze out of the fibre and form a resin pocket.

The material is molded in a positive pressure mold, under heat until thoroughly cured, as is the practice with other resinous compounds, and especially where intended for heavy duty bearings, it may then be stabilized in oil at 240° F. for fifteen hours. It is an advantage of my composition that it may be molded nearly to final shape, so as to require machining only of the bearing surfaces and these only to a relatively minor degree. Thus the wastage, cost, and consumption of time involved in the machining of half-round bearings from solid rectangular blocks of molded substance is largely saved.

Where graphite or other fillers are employed, these may be added at any stage of the mixing process, or may be mixed with the resin or varnish prior to the addition of the resin to the mixing device.

A variant of the procedures outlined above may comprise forming the resin on the fibres during the mixing operation. Thus the fibre may be mixed with cresylic acid and formaldehyde, in the known proper proportions for resin formation, in a hot Werner-Pfleiderer mixer fitted with a reflux condenser. The resin will thus be formed in liquid condition on the fibres, giving excellent penetration, and enhanced moisture resistance. The water formed during the reaction will be removed, preferably under vacuum as well as heat, after the resin has set up to the proper stage, and the mixing continued as before.

The process herein described is applicable to the manufacture of non-dimensional change material by a double association procedure, somewhat similar to the double saturation steps described in my copending application Ser. No. 759,952, filed Dec. 31, 1934, and entitled Processes of handling resinous stocks.

In making the present type of composition most resistant to dimensional change, I first treat the fibres with a water-type soluble varnish. As a typical example, I may use 100 parts tar acid, preferably a xylenol cut, 90 parts formaldehyde solution, and one part hydrated lime. These ingredients may be mixed together in an open kettle, and without the application of heat, since the reaction is productive of heat. The temperature is usually allowed to rise to 180° F., and may be prevented from rising further by cooling the kettle. The resin thus formed stays in solution in the water of the reaction, but may be additionally stabilized with a small amount of alcohol, if desired. The fibrous material, in a suitable mixer is first treated with this water soluble varnish, and then during a continuation of the mixing is thoroughly dried. In this way the resinous content of the fibres may be brought to, say, 20 to 30%. After complete drying, an alcohol varnish may be added by the process above described to bring the resin content up to 55 or 65%.

I am not limited, of course, to the use of chopped tire cord, but may employ instead, cotton linters, long-fibre cotton, chopped rags, macerated canvas, or any other fibrous material in whole or in part. Nor am I limited to the particular types of resin disclosed. As known in the art I may employ any number of variations of resin according to the characteristics desired in the finished product.

By the process outlined, I have been able to produce materials having all of the strength requirements of known laminated materials, having the additional advantage of equal strength in different directions, having no tendency toward delamination, and if desired, safely containing much more graphite than has been thought suitable heretofore.

Modifications may be made in my invention without departing from the spirit of it. Having thus described my invention, what I claim as new and desire to secure by Letters Patent is:

1. A process of making a heavy duty, non-dimensional change molding composition of resinous character, which comprises treating a loose mass of fibrous material in a mixing device under conditions of heat, first with a water soluble resin varnish, drying the water out of the mass, and afterward treating said mass, while mixing it, with an alcohol solution of resinous substance, continuing the mixing to the point of driving out the solvent and setting up the resinous substance on the fibres to a plastic and non-flowing condition.

2. A resinous composition suitable for molding, comprising a loose mass of fibrous material having in association with the fibres and uniformly distributed throughout the mass, a resinous substance derived in part from a water soluble, resinous varnish and in part from an alcohol soluble resinous varnish.

3. The composition of claim 2 having in homogeneous association therewith, a quantity of finely divided graphite.

EDWARD R. DILLEHAY.